(12) United States Patent
Song et al.

(10) Patent No.: US 12,051,236 B2
(45) Date of Patent: Jul. 30, 2024

(54) METHOD FOR RECOGNIZING VIDEO ACTION, AND DEVICE AND STORAGE MEDIUM THEREOF

(71) Applicant: BIGO TECHNOLOGY PTE. LTD., Singapore (SG)

(72) Inventors: Li Song, Guangzhou (CN); Feng Shi, Guangzhou (CN); Fan Wang, Guangzhou (CN); Shan Lu, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 171 days.

(21) Appl. No.: 17/278,195

(22) PCT Filed: Aug. 27, 2019

(86) PCT No.: PCT/CN2019/102717
§ 371 (c)(1),
(2) Date: Mar. 19, 2021

(87) PCT Pub. No.: WO2020/057329
PCT Pub. Date: Mar. 26, 2020

(65) Prior Publication Data
US 2022/0130146 A1 Apr. 28, 2022

(30) Foreign Application Priority Data
Sep. 21, 2018 (CN) .......................... 201811107097.0

(51) Int. Cl.
*G06V 10/82* (2022.01)
*G06T 7/20* (2017.01)
(Continued)

(52) U.S. Cl.
CPC ................. *G06V 10/82* (2022.01); *G06T 7/20* (2013.01); *G06T 7/70* (2017.01); *G06V 10/764* (2022.01);
(Continued)

(58) Field of Classification Search
CPC ...... G06V 10/22–764; G06V 40/20–28; G06T 2207/10016–30241
See application file for complete search history.

(56) References Cited

U.S. PATENT DOCUMENTS 9,600,717 B1  3/2017  Dai
10,366,300 B1 * 7/2019  Flowers ................. G06V 20/64
(Continued)

FOREIGN PATENT DOCUMENTS

CN    103020648 A    4/2013
CN    103077532 A    5/2013
(Continued)

OTHER PUBLICATIONS

"Raul Rojas, The Kalman Filter, 2003, Freie Universitat Berlin, Institut f ur Informatik, robocup" (Year: 2003).*
(Continued)

*Primary Examiner* — Andrae S Allison
*Assistant Examiner* — Phuong Hau Cai
(74) *Attorney, Agent, or Firm* — Kolitch Romano Dascenzo Gates LLC (57) ABSTRACT

A method for recognizing a video action includes determining an action category and action positioning information of a current video frame based on the current video frame and at least one forward video frame; and determining action content of a video based on the action category and the action positioning information of the current video frame.

16 Claims, 7 Drawing Sheets

(51) Int. Cl.
  *G06T 7/70* (2017.01)
  *G06V 10/764* (2022.01)
  *G06V 20/40* (2022.01)
  *G06V 40/20* (2022.01)

(52) U.S. Cl.
  CPC .............. *G06V 20/41* (2022.01); *G06V 20/46* (2022.01); *G06V 40/20* (2022.01); *G06V 40/28* (2022.01); *G06T 2207/10016* (2013.01); *G06T 2207/30241* (2013.01)

(56) References Cited

U.S. PATENT DOCUMENTS

| | | | |
|---|---|---|---|
| 11,170,210 B2 * | 11/2021 | Wang | G06V 10/764 |
| 2004/0071317 A1 | 4/2004 | Pavlovic et al. | |
| 2015/0269425 A1 * | 9/2015 | Mazurenko | G06K 9/6256 |
| | | | 382/103 |
| 2019/0354194 A1 * | 11/2019 | Wang | G06T 7/0014 |
| | | | 382/133 |

FOREIGN PATENT DOCUMENTS

| | | | | |
|---|---|---|---|---|
| CN | 104049760 A | | 9/2014 | |
| CN | 107341436 A | | 11/2017 | |
| CN | 107766839 A | | 3/2018 | |
| CN | 107786549 A | | 3/2018 | |
| CN | 107808143 A | | 3/2018 | |
| CN | 108181989 A | | 6/2018 | |
| CN | 108197596 A | | 6/2018 | |
| CN | 108229277 A | | 6/2018 | |
| CN | 108241849 A | * | 7/2018 | .............. G06F 3/011 |
| CN | 108241849 A | | 7/2018 | |
| CN | 109344755 A | | 2/2019 | |
| EP | 2431841 B1 | | 11/2017 | |
| JP | 10162151 A | * | 6/1998 | ......... G06K 9/00335 |

OTHER PUBLICATIONS

"Gomez-Gil Jaime, A Kalman Filter Implementation for Precision Improvement in Low-Cost GPS Positioning of Tractors, Jaime Gomez-Gil et al., Sensors 13, 2013, ISSN 1424-8220, pp. 15307-15323" (Year: 2013).*

"F.R Castella, F.G. Dunnebacke, Analytical Results For the x, y Kalman, Tracking Filter, Johns Hopkins University, Jun. 21, 1974. Copyright 1974 by IEEE Trans. Aerospace and Electronic Systems, vol. AES-1 0, No. 6" (Year: 1974).*

"Chang Guo-bin, Hybrid Kalman and unscented Kalman filters for INS/GPS integrated system considering constant lever arm effect, J. Cent. South Univ. (2015) 22: 575-583, Central South University Press and Springer-Verlag Berlin Heidelberg 2015" (Year: 2015).*

"Jawad Nagi et al., Max-Pooling Convolutional Neural Networks for Vision-based Hand Gesture Recognition, 2011 IEEE International Conference on Signal and Image Processing Applications, ICSIPA2011" (Year: 2011).*

"Rohit Pandey et al., Real-time Egocentric Gesture Recognition on Mobile Head Mounted Displays, Computer Vision and Pattern Recognition, Cornell University, 2017" (Year: 2017).*

"Hong Cheng et al., Survey on 3D Hand Gesture Recognition, IEEE Transactions on Circuits and Systems for Video Technology, vol. 26, No. 9, Sep. 2016" (Year: 2016).*

"Basura Fernando et al., Modeling Video Evolution for Action Recognition, 2015, Proceedings of the IEEE Conference on Computer Vision and Pattern Recognition, 2015, pp. 5378-5387" (Year: 2015).*

International Search Report of the International Searching Authority for China National Intellectual Property Administration in PCT application No. PCT/CN2019/102717 issued on Nov. 27, 2019, which is an international application corresponding to this U.S. application.

The State Intellectual Property Office of People's Republic of China, First Office Action in Patent Application No. 201811107097.0 issued on May 26, 2020, which is a foreign counterpart application corresponding to this U.S. Patent Application, to which this application claims priority.

The State Intellectual Property Office of People's Republic of China, Second Office Action in Patent Application No. 201811107097.0 issued on Aug. 28, 2020, which is a foreign counterpart application corresponding to this U.S. Patent Application, to which this application claims priority.

The State Intellectual Property Office of People's Republic of China, Third Office Action in Patent Application No. 201811107097.0 issued on Nov. 24, 2020, which is a foreign counterpart application corresponding to this U.S. Patent Application, to which this application claims priority.

The Hague, Extended European Search Report Communication Pursuant to Rule 62 EPC, dated Dec. 17, 2021 in Patent Application No. EP 19862600.4, which is a foreign counterpart application to which this application claims priority.

Hsieh, Chen-Chiung et al.; "A Real Time Hand Gesture Recognition System Using Motion History Image"; 2010 2nd International Conference on Signal Processing Systems (ICSPS), IEEE, Piscataway, NJ, USA, pp. 394-398, abstract, pp. 394-397, figure 6; Jul. 5, 2010.

* cited by examiner

METHOD FOR RECOGNIZING VIDEO ACTION, AND DEVICE AND STORAGE MEDIUM THEREOF

This application is a US national stage of international application No. PCT/CN2019/102717, filed on Aug. 27, 2019, which claims priority to Chinese Patent Application No. 201811107097.0, filed on Sep. 21, 2018. Both applications are incorporated herein by reference in their entirety.

TECHNICAL FIELD

Embodiments of the present disclosure relate to the technical field of action recognition, for example, to a method for recognizing a video action, and a device and storage medium thereof.

BACKGROUND

With the rapid development of related arts such as computer vision and machine learning, human-computer interaction technology has been receiving more and more attention. In human-computer interaction, it is necessary to recognize a user's body information such as face recognition, gesture recognition, and body posture recognition. The gesture recognition may be used as an intuitive communication method and has important research significance.

Video gesture recognition is usually applied in application scenarios that require strong interaction. When continuously positioning and recognizing user gestures, the gesture recognition is subject to uncontrollable factors such as complex background, blurred motion, and non-standard actions.

SUMMARY

Embodiments of the present disclosure provide a method for recognizing a video action, and a device and a storage medium thereof.

In a first aspect, the embodiments of the present disclosure provide a method for recognizing a video action. The method includes: determining an action category and action positioning information of a current video frame based on the current video frame and at least one forward video frame; and determining action content of a video based on the action category and the action positioning information of the current video frame.

In a second aspect, the embodiments of the present disclosure further provide a computer device. The computer device includes a memory, a processor, and a computer program stored on the memory and running on the processor, wherein the processor, when running the computer program, is caused to perform the method for recognizing a video action as described in the embodiments of the present disclosure.

In a third aspect, an embodiment of the present disclosure also provides a non-transitory computer-readable storage medium storing a computer program therein, wherein the computer program, when run by a processor, causes the processor to perform the method for recognizing a video action as described in the embodiments of the present disclosure.

DETAILED DESCRIPTION

Gesture recognition processing performed on an image in a video in the related art cannot ensure the stability and smoothness of the gesture recognition result. Embodiments of the present disclosure provide a method for recognizing a video action, and a device and a storage medium thereof, which can improve the stability and smoothness of the action recognition result.

Figure 1:
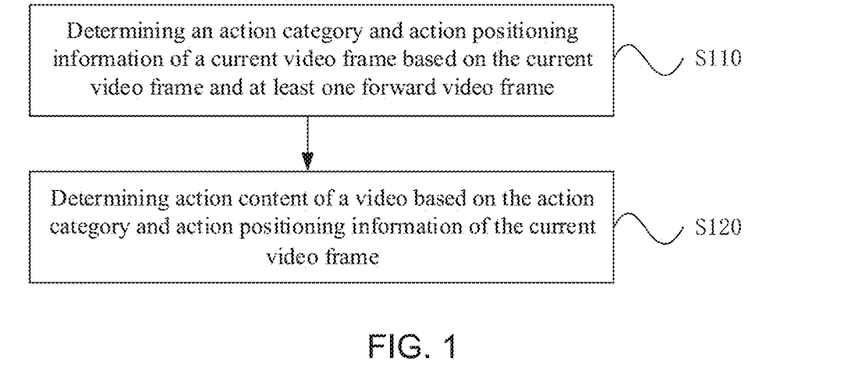
FIG. 1 is a flowchart of a method for recognizing a video action according to an embodiment of the present disclosure.

FIG. 1 is a flowchart of a method for recognizing a video action according to an embodiment of the present disclosure. This embodiment is applicable to recognizing a user's action in a live video. The method may be executed by an apparatus for recognizing a video action, which may be composed of at least one of hardware and software, and may generally be integrated in a device with a video action recognition function. The device may be an electronic device such as a server, a mobile terminal, or a server cluster. As shown in FIG. 1, the method includes 110 to 120.

In 110, an action category and action positioning information of a current video frame are determined based on the current video frame and at least one forward video frame.

The forward video frame may be a video frame before the corresponding time of the current video frame. The number of forward video frames may be one or more than one. In an embodiment, the action category and the action positioning information of the current video frame are determined based on the current video frame and one previous video frame of the current video frame. In this example, the number of forward video frames is 1, and the forward video frame is the previous video frame of the current video frame. In another embodiment, the number of the forward video is greater than one, for example ten (i.e., the number or the quantity of the forward videos frames is 10). The video may be a live video or an on-demand video. The action may include a user's gesture, body posture, etc., which is a gesture in an embodiment. When the action is a gesture, the action category may be an aspect of the gesture or a form of gesture, and the action positioning information may be a movement trajectory of the gesture. For example, the aspect of the gesture may include: a thumb-up gesture, an "OK" gesture, a gesture of making a heart shape with two hands, a gesture of making a heart shape with one hand, a gesture of making a pistol shape, a "Yeah" gesture, and a hand-holding gesture.

In this embodiment, determining the action category and the action positioning information of the current video frame based on the current video frame and the at least one forward video frame may include: simultaneously inputting the current video frame and the at least one forward video frame into an action recognition model, and acquiring the action category and action positioning information of the current video frame by analyzing the current video frame and at least one forward video frame; or, acquiring the action category and action positioning information corresponding to each video frame (including the current video frame and the at least one forward video frame) by inputting the current video frame and the at least one forward video frame into the action recognition model respectively, and finally acquiring a target action category and target action positioning information of the current video frame by correcting the action category and action positioning information of the current video frame with the action category and action positioning information of the at least one forward video frame. The action category and the action positioning information of the current video frame are intended to determine the action content of the video in 120.

In 120, an action content of a video is determined based on the action category and action positioning information of the current video frame.

The action content may be the information to be conveyed by the action. In an exemplary embodiment, taking gestures as an example, the action content may include: thumb-up, "OK," making a heart shape with two hands, making a heart shape with one hand, making a pistol shape, "Yeah" and hand-holding or the like.

Upon acquisition of the action category and action positioning information of the current video frame in the video, the action content in the video may be determined. In an embodiment, in this application scenario, upon acquisition the action category and action positioning information of the current video frame, predefined special effects may be triggered at an action positioning point in combination with the action category.

The technical solution according to this embodiment is to determine an action category and action positioning information of a current video frame based on the current video frame and at least one forward video frame, and finally determine action content of a video based on the action category and action positioning information of the current video frame. The method for recognizing a video action according to the embodiment of the present disclosure determines an action category and action positioning information of a current video frame based on the current video frame and at least one forward video frame, which can improve the stability of action category recognition and the smoothness of action positioning information recognition.

Figure 2:
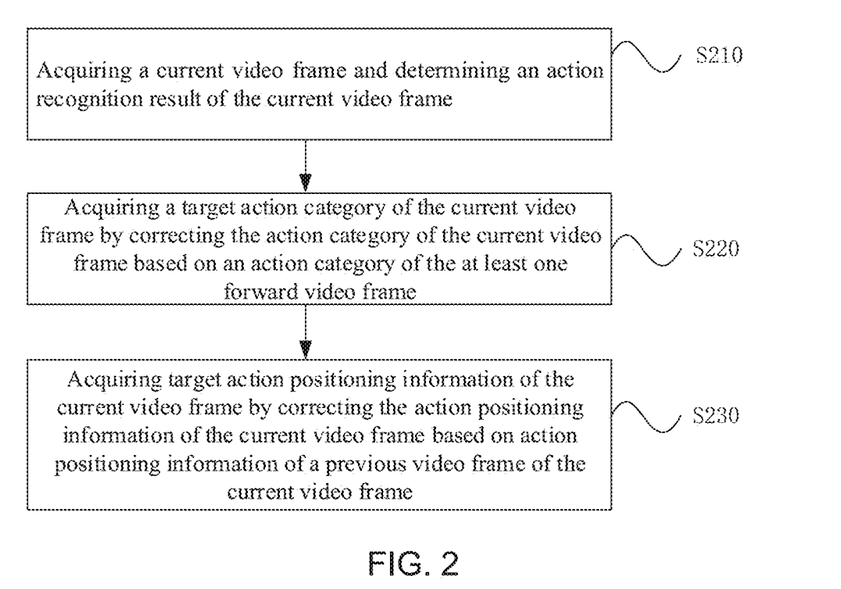
FIG. 2 is a flowchart of a method for recognizing a video action according to an embodiment of the present disclosure.

FIG. 2 is a flowchart of a method for recognizing a video action according to an embodiment of the present disclosure. As an explanation of the foregoing embodiment, as shown in FIG. 2, determining the action category and the action positioning information of the current video frame based on the current video frame and the at least one forward video frame may be implemented by 210 to 230.

In 210, a current video frame is acquired and an action recognition result of the current video frame is determined.

The action recognition result includes an action category and action positioning information. The action positioning information may be action block positioning information, including a width of an action block, a height of the action block, and center coordinates of the action block.

In this embodiment, the action category and action positioning information of the current video frame may be acquired by inputting the current video frame into an action recognition model. In an embodiment, determining the action category of the current video frame may include: acquiring a confidence of at least one defined action category by inputting the current video frame into an action recognition model, and selecting a defined action category with a highest confidence as the action category of the current video frame.

The action recognition model may be trained using a convolutional neural network, and has the function of recognizing action categories and action positioning information in video frames. The defined action category may be a category predefined in the system. Assuming that the action is a gesture, the defined action category may include thumb-up, "OK", making a heart shape with two hands, making a heart shape with one hand, making a pistol shape, "Yeah" and hand-holding or the like. In response to inputting the current video frame into an action recognition model, a confidence of a defined action category corresponding to the current video frame is acquired, and a defined action category with the highest confidence is taken as the action category of the current video frame. In an exemplary embodiment, assuming that the confidence of the defined action category corresponding to the current video frame is: thumb-up is 0.1, "OK" is 0.25, making a heart shape with two hands is 0.3, making a heart shape with one hand is 0.3, making a pistol shape is 0.8, "Yeah" is 0.4 and hand-holding is 0.2, then the action category of the current video frame is "making a pistol shape".

In an embodiment, determining the action positioning information of the current video frame may include: inputting the current video frame into an action recognition model, and outputting a width of an action block, a height of the action block, and center coordinates of the action block.

In 220, a target action category of the current video frame is acquired by correcting the action category of the current video frame based on an action category of the at least one forward video frame.

In an embodiment, acquiring the target action category of the current video frame by correcting the action category of the current video frame based on the action category of the at least one forward video frame may include: summing the confidences of each of the at least one defined action category in the at least one forward video frame and the current video frame; acquiring a defined action category with a highest sum of the confidences; among the action categories of the at least one forward video frame and the current video frame, if the number of action categories being the same as the defined action category with the highest sum of the confidences exceeds a defined number, determining the defined action category with the highest sum of the confidences as the target action category; and among the action categories of the at least one forward video frame and the current video frame, if the number of action categories being the same as the defined action category with the highest sum of the confidences does not exceed the defined number, determining the action category of the current video frame as the target action category.

The defined number may be determined based on the number of forward video frames. For example, the defined number may be any value between 50% and 80% of the number of forward video frames. In an embodiment, a defined action category with the highest sum of the confidences may be calculated according to the following formula $n=\text{argmax}_c \Sigma_{f=i-k+1}^{i}(\text{argmax}(prob_f)*1_{argmax(prob_f)=c})$, for $c=1, \ldots, N(i>k+1)$, where n represents the defined action category with the highest sum of the confidences, probf represents a defined action category confidence vector of the f-th video frame, N represents the number of defined action categories, c represents the number corresponding to the defined action category, the number of forward video frames is $k-1$, and $1\text{argmax}(prob_f)=c$ means that when probf takes c, the value is 1, and when probf takes other values, the value is 0. After the defined action category with the highest sum of the confidences is determined as n, the target action category may be determined according to the following formula:

$$C = \begin{cases} n, & \sum_{f=i-k+1}^{i}\left(1_{argmax(prob_f)=n}\right) \geq j \\ c_i, & \text{others} \end{cases},$$

where C represents the target action category, j represents the defined number, and ci represents the action category of the current video frame.

In 230, target action positioning information of the current video frame is acquired by correcting the action positioning information of the current video frame based on action positioning information of a previous video frame of the current video frame.

In this application scenario, the action positioning information of the current video frame is corrected based on action positioning information of a previous frame of the current video frame. In an embodiment, acquiring the target action positioning information of the current video frame by correcting the action positioning information of the current video frame based on the action positioning information of the previous video frame may include: acquiring a gain factor for the width or the height of the action block; and calculating a width or a height of a target action block according to the following formula based on the gain factor: $x=x2+k(x1-x2)$; where x represents the width or the height of the target action block, k represents the gain factor, x1 represents a width or a height of an action block of the current video frame, and x2 represents a width of an action block of the previous video frame or a height of an action block of the forward video frame; and calculating center coordinates of the target action block according to the following formula based on the gain matrix: $Y=Y2+K*(Y1-H*Y2)$; where Y represents the center coordinates of the target action block, Y2 represents is center coordinates of the action block of the previous video frame, K represents the gain matrix, H represents a unitary matrix, and Y1 represents the center coordinates of the action block of the current video frame.

The gain factor may be calculated according to the following formula: $k=p\_/(p\_+r)$, where $p\_=p+q$, p represents a posterior error, p represents a prior error, q represents a process deviation, and r represents a measurement deviation. The process deviation and measurement deviation may be acquired upon experimentation, and the posterior error may be acquired iteratively according to the following formula: $p=(1-k)*p\_$.

The gain matrix may be calculated according to the following formula: $K=P\_*H^T*S^{-1}$, where $P\_=A*err*A^T+Q$, $S=H*P\_*H^T+R$, A represents a motion matrix, Q represents a process variance matrix, R represents a measurement variance matrix, err represents a center point error matrix, and H represents a unitary matrix. The center point error matrix may be acquired iteratively according to the following formula: $err=(1-K*H)*P\_$.

In an embodiment, the method for recognizing a video action further includes the following processes: determining whether an absolute value of a difference between the positioning information of the target action block and the positioning information of the action block of the previous video frame is less than a predefined threshold; and updating the positioning information of the target action block to the positioning information of the action block of the previous video frame based on a determination result that the absolute value of the difference between the positioning information of the target action block and the positioning information of the action block of the previous video frame is less than the predefined threshold.

The predefined threshold may be defined to any value between 1 to 10 pixels. In an embodiment, it is defined to 3 or 4 pixels.

In this embodiment, when the absolute value of the difference between the width of the target action block and the width of the action block of the previous video frame is less than the predefined threshold, the width of the target action block is updated to the width of the action block of the previous video frame. When the absolute value of the difference between the height of the target action block and the height of the action block of the previous video frame is less than the predefined threshold, the height of the target action block is updated to the height of the action block of the previous video frame. When the absolute value of the difference between the abscissa of the center coordinates of the target action block and the abscissa of the center coordinates of the action block of the previous frame is less than the predefined threshold, the abscissa of the center coordinates of the target action block is updated to the abscissa of the center coordinates of the action block of the previous video frame. When the absolute value of the difference between the ordinate of the center coordinates of the target action block and the ordinate of the center coordinates of the action block of the previous video frame is less than the predefined threshold, the ordinate of the center coordinates of the target action block is updated to the ordinate of the center coordinates of the action block of the previous video frame.

In the technical solution according to this embodiment, the action category of the current video frame is corrected based on an action category of the at least one forward video frame, and the action positioning information of the current video frame is corrected based on action positioning information of a previous frame of the current video frame, which can improve stability and smoothness for video action recognition.

Figure 3:
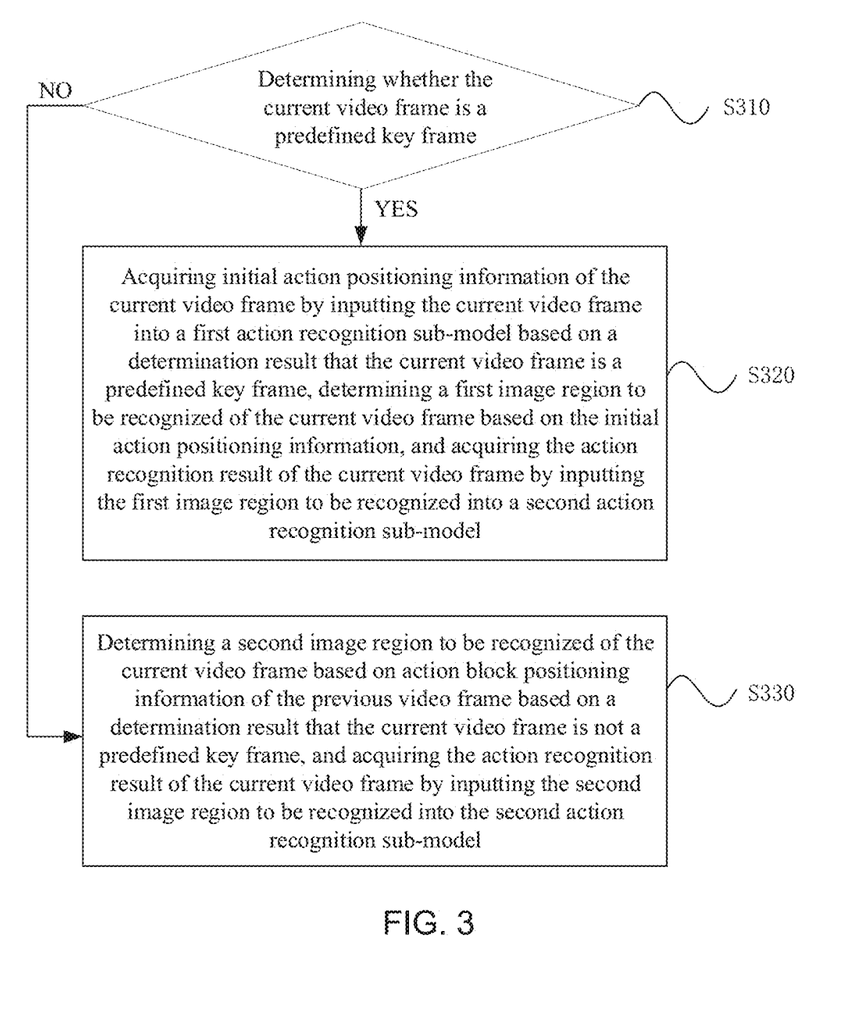
FIG. 3 is a flowchart of a method for recognizing a video action according to an embodiment of the present disclosure.

FIG. 3 is a flowchart of a method for recognizing a video action according to an embodiment of the present disclosure. As an explanation of the foregoing embodiment, as shown in FIG. 3, acquiring the current video frame and determining the action recognition result of the current video frame may be implemented by 310 to 330.

In 310, whether the current video frame is a predefined key frame is determined.

The predefined key frame may be determined as a key frame that is spaced apart by a defined number of video frames according to actual needs. In one example, the key frames are spaced apart by 10 video frames (i.e., the first frame and the eleventh frame etc. are the key frames).

In 320, initial action positioning information of the current video frame is acquired by inputting the current video frame into a first action recognition sub-model based on a determination result that the current video frame is a predefined key frame, a first image region to be recognized of the current video frame is determined based on the initial action positioning information, and the action recognition result of the current video frame is acquired by inputting the first image region to be recognized into a second action recognition sub-model.

The first action recognition sub-model and the second action recognition sub-model are trained using different convolutional neural networks. The first action recognition sub-model may be acquired using dense convolutional network (DenseNet) or ResNet. The second action recognition sub-model may be acquired using MobileNet-v2.

In an embodiment, initial action positioning information is acquired by inputting the current video frame into a first action recognition sub-model based on a determination result that the current video frame is a predefined key frame. Upon acquisition of the initial action positioning information, a first image region to be recognized is acquired in response to expanding a defined region or defined pixel points based on a region encircled by the initial action block, and finally the action recognition result of the current video frame is acquired by inputting the first image region to be recognized into a second action recognition sub-model.

In 330, based on a determination result that the current video frame is not a predefined key frame, a second image region to be recognized of the current video frame is determined based on action block positioning information of the previous video frame, and the action recognition result of the current video frame is acquired by inputting the second image region to be recognized into the second action recognition sub-model.

In an embodiment, based on a determination result that the current video frame is not a predefined key frame, a second image region to be recognized is acquired by expanding a defined region or defined pixel points based on a region encircled by the action block of the previous video frame, and finally the action recognition result of the current video frame is acquired by inputting the second image region to be recognized into the second action recognition sub-model.

In the technical solution according to this embodiment, the action recognition result is acquired by sequentially inputting a predefined key frame into the first action recognition sub-model and the second action recognition sub-model, and the action recognition result is acquired by inputting a non-predefined key frame into the second action recognition sub-model, which can increase the speed of image recognition while ensuring recognition accuracy.

Figure 4A:
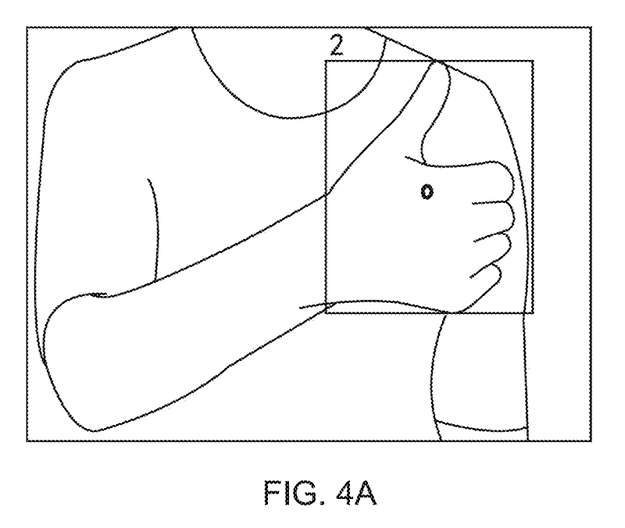
FIG. 4A is a diagram of the recognition effect of a "thumb-up" gesture according to an embodiment of the present disclosure.
Figure 4B:
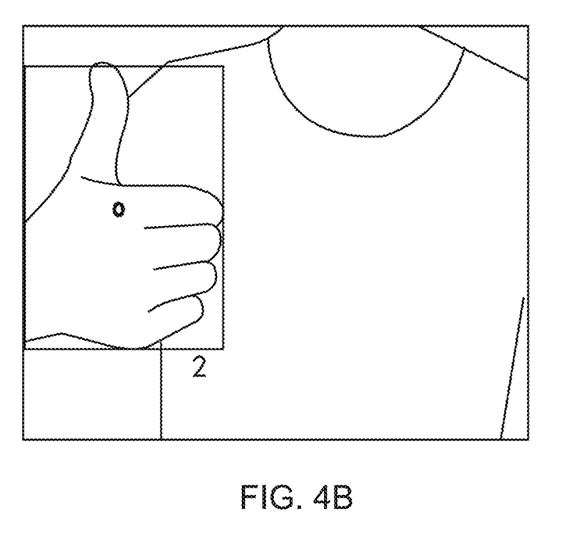
FIG. 4B is a diagram of the recognition effect of a "thumb-up" gesture according to an embodiment of the present disclosure.
Figure 4C:
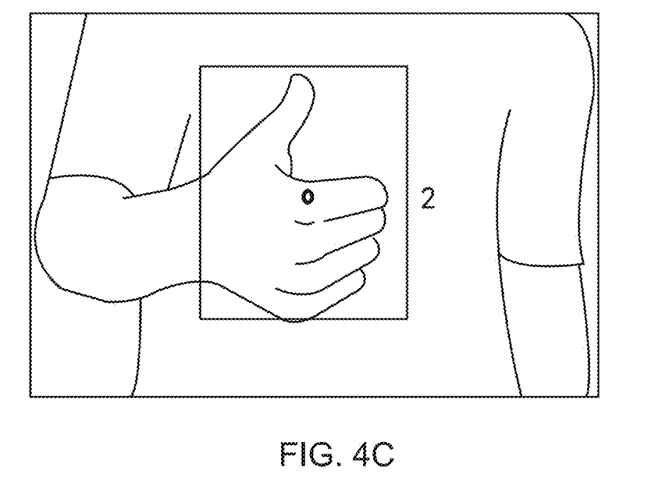
FIG. 4C is a diagram of the recognition effect of a "thumb-up" gesture according to an embodiment of the present disclosure.
Figure 4D:
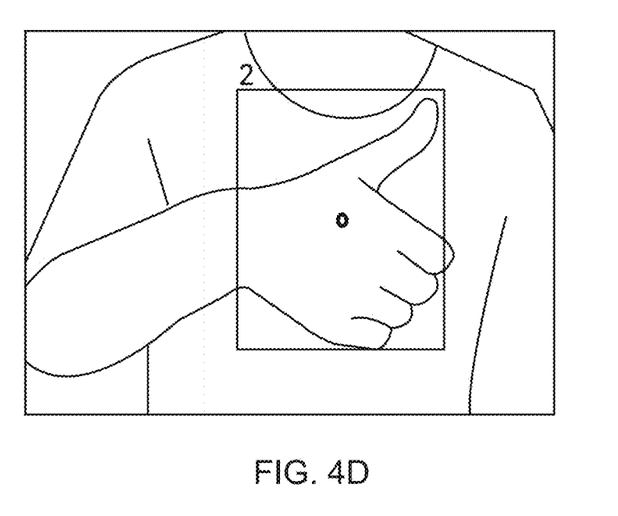
FIG. 4D is a diagram of the recognition effect of a "thumb-up" gesture according to an embodiment of the present disclosure.

In an exemplary embodiment, FIGS. 4A and 4D are diagrams of the recognition effect of the "thumb-up" gesture according to an embodiment of the present disclosure. As shown in FIGS. 4A-4D, "2" indicates that the gesture category of the video frame is "thumb-up." After inputting each video frame into the action recognition model, a gesture category of the video frame may be determined as "2," that is, thumb-up. The gesture positioning information, including a width of a gesture frame, a height of the gesture frame, and center coordinates of the gesture frame may be acquired as well.

Figure 5A:
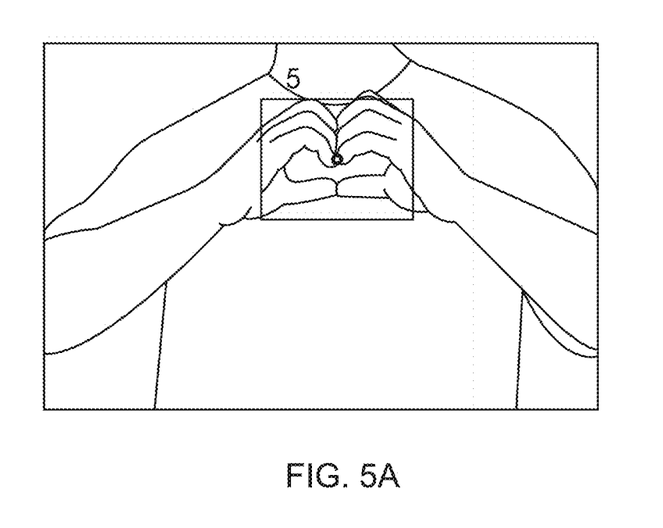
FIG. 5A is a diagram of the recognition effect of the gesture of "making a heart shape with two hands" according to an embodiment of the present disclosure.
Figure 5B:
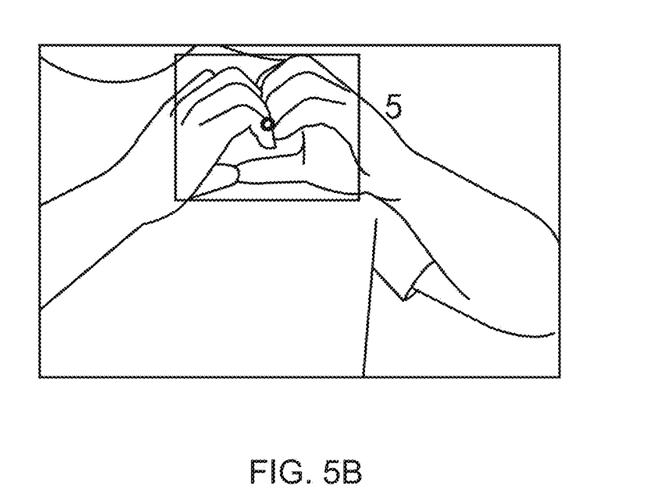
FIG. 5B is a diagram of the recognition effect of the gesture of "making a heart shape with two hands" according to an embodiment of the present disclosure.
Figure 5C:
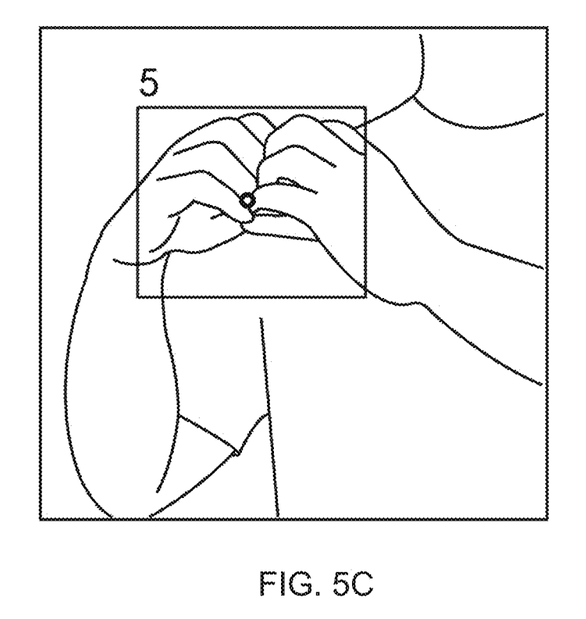
FIG. 5C is a diagram of the recognition effect of the gesture of "making a heart shape with two hands" according to an embodiment of the present disclosure.

FIGS. 5A-5C are diagrams of the recognition effect of the "making a heart shape with two hands" gesture according to an embodiment of the present disclosure. As shown in FIGS. 5A-5C, "5" indicates that the gesture category of the video frame is "making a heart shape with two hands." In response to inputting each video frame into the action recognition model, a gesture category of the video frame may be acquired as "5," that is, making a heart shape with two hands. The gesture positioning information, including a width of a gesture frame, a height of the gesture frame and center coordinates of the gesture frame may be acquired as well.

Figure 6:
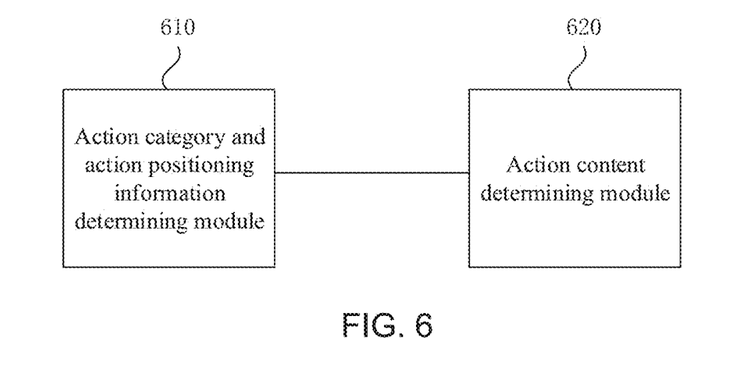
FIG. 6 is a schematic structural diagram of an apparatus for recognizing a video action according to an embodiment of the present disclosure.

FIG. 6 is a schematic structural diagram of an apparatus for recognizing a video action according to an embodiment of the present disclosure. As shown in FIG. 6, the apparatus includes: an action category and action positioning information determining module 610 and an action content determining module 620.

The action category and action positioning information determining module 610 is configured to determine an action category and action positioning information of a current video frame based on the current video frame and at least one forward video frame.

The action content determining module 620 is configured to determine action content of a video based on the action category and the action positioning information of the current video frame.

In an embodiment, the action category and action positioning information determining module 610 is configured to:
  acquire a current video frame and determine an action recognition result of the current video frame, wherein the action recognition result includes an action category and action positioning information;
  acquire a target action category of the current video frame by correcting the action category of the current video frame based on an action category of the at least one forward video frame; and
  acquire target action positioning information of the current video frame by correcting the action positioning information of the current video frame based on action positioning information of a previous video frame of the current video frame;
  wherein the action category and the action positioning information of the current video frame are intended to determine the action content of the video.

In an embodiment, the action category and action positioning information determining module 610 is configured to:
  acquire a confidence of at least one defined action category by inputting the current video frame into an action recognition model; and
  select a defined action category with a highest confidence as the action category of the current video frame.

In an embodiment, the action category and action positioning information determining module 610 is configured to:
  sum the confidences of each of the at least one defined action category in the at least one forward video frame and the current video frame;
  acquire a defined action category with a highest sum of the confidences;
  among the action categories of the at least one forward video frame and the current video frame, if the number of action categories being the same as the defined action category with the highest sum of the confidences exceeds a defined number, determine the defined action category with the highest sum of the confidences as the target action category; or among the action categories of the at least one forward video frame and the current video frame, if the number of action categories being the same as the defined action category with the highest sum of the confidences does not exceed the defined number, determine the action category of the current video frame as the target action category.

In an embodiment, the action positioning information includes a width of an action block, a height of the action block, and center coordinates of the action block.

In an embodiment, the action category and action positioning information determining module 610 is configured to:

acquire a gain factor for the width or the height of the action block; and calculate a width or a height of a target action block according to the following formula based on the gain factor:

$$x=x2+k(x1-x2);$$

where x represents the width or the height of the target action block, k represents the gain factor, x1 represents a width or a height of an action block of the current video frame, and x2 represents a width of an action block of the previous video frame or a height of an action block of the previous video frame;

acquire a gain matrix for the center coordinates of the action block; and calculate center coordinates of the target action block according to the following formula based on the gain matrix:

$$Y=Y2+K*(Y1-H*Y2);$$

where Y represents the center coordinates of the target action block, Y2 represents center coordinates of the action block of the previous video frame, K represents the gain matrix, H represents a unitary matrix, and Y1 represents center coordinates of the action block of the current video frame.

In an embodiment, the action category and action positioning information determining module 610 is configured to:

update the positioning information of the target action block to the positioning information of the action block of the previous video frame based on a determination result that the absolute value of the difference between the positioning information of the target action block and the positioning information of the action block of the previous video frame is less than the predefined threshold.

In an embodiment, the gain factor is calculated according to the following formula:

$$k=p\_/(p\_+r);$$

where $p\_=p+q$, p represents a posterior error, $p\_$ represents a prior error, q represents a process deviation, and r represents a measurement deviation.

The gain matrix is calculated according to the following formula:

$$K=P\_*H^T*S^{-1};$$

where $P\_=A*err*A^T+Q$, $S=H*P\_*H^T+R$, A represents a motion matrix, Q represents a process variance matrix, R represents a measurement variance matrix, err represents a center point error matrix, and H represents a unitary matrix.

In an embodiment, the action category and action positioning information determining module 610 is configured to:

acquire initial action positioning information of the current video frame by inputting the current video frame into a first action recognition sub-model based on a determination result that the current video frame is a predefined key frame; and determine a first image region to be recognized of the current video frame based on the initial action positioning information, and acquire the action recognition result of the current video frame by inputting the first image region to be recognized into a second action recognition sub-model, wherein the first action recognition sub-model and the second action recognition sub-model are trained using different convolutional neural networks; and determine a second image region to be recognized of the current video frame based on action block positioning information of the previous video frame based on a determination result that the current video frame is not a predefined key frame, and acquire the action recognition result of the current video frame by inputting the second image region to be recognized into the second action recognition sub-model.

In an embodiment, the action is a user's gesture, the action category is an aspect of the gesture, and the action positioning information is a movement trajectory of the gesture.

The above-mentioned apparatus may carry out the methods according to all the foregoing embodiments of the present disclosure. For technical details not described in detail in this embodiment, reference may be made to the methods according to all the foregoing embodiments of the present disclosure.

Figure 7:
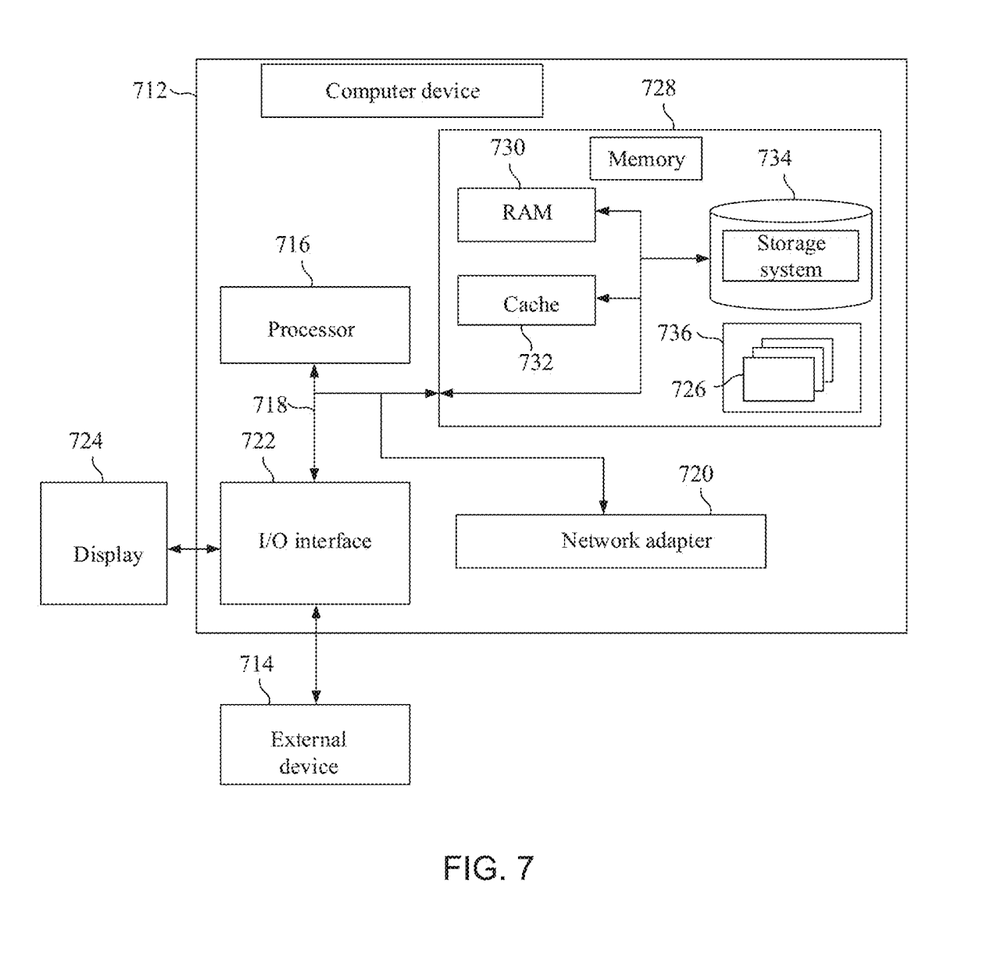
FIG. 7 is a schematic structural diagram of a computer device according to an embodiment of the present disclosure.

FIG. 7 is a schematic structural diagram of a computer device according to an embodiment of the present disclosure. FIG. 7 shows a block diagram of a computer device 712 applicable to implementing the embodiments of the present disclosure. The computer device 712 shown in FIG. 7 is only an example, and should not bring any limitation to the function and scope of use of the embodiments of the present disclosure. The device 712 is typically a computing device that is responsible for recognizing video actions.

As shown in FIG. 7, the computer device 712 is embodied in the form of a general-purpose computing device. Components of the computer device 712 may include, but are not limited to: at least one processor 716, a storage device 728, and a bus 718 connecting different system components (including the storage device 728 and the processor 716).

The bus 718 represents one or more of several types of bus structures, including a memory bus or a memory controller, a peripheral bus, a graphics acceleration port, a processor, or a local bus using any of the various bus structures. For example, these architectures include but are not limited to industry standard architecture (ISA) bus, micro channel architecture (MCA) bus, enhanced ISA bus, Video Electronics Standards Association (VVESA) local bus and peripheral component interconnect (PCI) bus.

The computer device 712 typically includes a variety of computer system readable mediums. The mediums may be any available mediums that may be accessed by the computer device 712, including volatile and non-volatile mediums, and removable and non-removable mediums.

The storage device 728 may include a computer system readable medium in the form of a volatile memory, such as at least one of a random-access memory (RAM) 730 and a cache memory 732. The computer device 712 may further include other removable/non-removable, volatile/nonvolatile computer system storage medium. Just as an example, the storage system 734 may be used to read and write non-removable, non-volatile magnetic medium (not shown in FIG. 7, and generally referred to as a "hard drive"). Although not shown in FIG. 7, a disk drive for reading and writing a removable non-volatile disk (such as a "floppy disk") and a removable non-volatile optical disk (such as a compact disc read-only memory (CD-ROM), a digital video disc read-only memory (DVD-ROM) or other optical medium. In these cases, each drive may be connected to the bus 718 via at least one data medium interface. The storage device 728 may include at least one program product. The program product has a defined of (for example, at least one) program modules that are configured to perform the functions of the embodiments of the present disclosure.

A program 736 having a defined of (at least one) program module 726 may be stored in, for example, the storage device 728. Such program modules 726 include but are not limited to an operating system, at least one application, other program modules, and program data. Each of these examples or some combination may include an implementation of a network environment. The program module 726 generally executes the functions and/or methods in the embodiments of the present disclosure.

The computer device 712 may also communicate with at least one external device 714 (such as a keyboard, a pointing device, a camera, or a display 724), and may also communicate with at least one device that enables a user to interact with the computer device 712, and/or communicate with any device (such as a network card or a modem) that enables the computer device 712 to communicate with at least one other computing device. This communication may be performed via an input/output (I/O) interface 722. In addition, the computer device 712 may also communicate with at least one network, for example, a local region network (LAN), a wide region network, WAN) and/or a public network, such as the Internet, via a network adapter 720. As shown in the figure, the network adapter 720 communicates with other modules of the computer device 712 via the bus 718. It should be understood that although not shown in the figure, other hardware and/or software modules may be used in conjunction with the computer device 712, including but not limited to: microcode, device drivers, redundant processing units, external disk drive arrays, and redundant arrays of independent disks (RAID) systems, tape drives, and data backup storage systems.

The processor 716 executes various functional applications and data processing by running the programs stored in the storage device 728, such as implementing the method for recognizing a video action according to the foregoing embodiments of the present disclosure.

An embodiment of the present disclosure also provides a computer-readable storage medium having a computer program stored thereon. The computer program, when executed by a processor, performs the method for recognizing a video action according to the embodiments of the present disclosure.

An embodiment of the present disclosure also provides a non-transitory computer-readable storage medium having a computer program stored therein. The computer program is not limited to the method operations described above, and can also perform related operations in the method for recognizing a video action according to any embodiment of the present disclosure.

The computer storage medium according to the embodiment of the present disclosure may adopt any combination of at least one computer-readable medium. The computer-readable medium may be a computer-readable signal medium or a computer-readable storage medium. The computer-readable storage medium may be, for example, but is not limited to, an electrical, magnetic, optical, electromagnetic, infrared, or semiconductor system, apparatus, or device, or any combination thereof. More specific examples (non-exhaustive list) of the computer-readable storage medium include: an electrical connection with at least one wire, a portable computer disk, a hard disk, a RAM, a ROM, an erasable programmable read-only memory (EPROM or flash memory), an optical fiber, a portable CD-ROM, an optical storage device, a magnetic storage device, or any suitable combination thereof. In this document, the computer-readable storage medium may be any tangible medium that contains or stores a program. The program may be used by or in combination with an instruction execution system, apparatus, or device.

The computer-readable signal medium may include a data signal propagated in baseband or as a part of a carrier wave, and computer-readable program code is carried therein. This propagated data signal may take many forms, including but not limited to electromagnetic signals, optical signals, or any suitable combination thereof. The computer-readable signal medium may also be any computer-readable medium other than the computer-readable storage medium. The computer-readable medium may send, propagate, or transmit the program for use by or in combination with the instruction execution system, apparatus, or device.

The program code contained on the computer-readable medium may be transmitted by any suitable medium, including but not limited to wireless, wire, optical cable, RF, etc., or any suitable combination thereof.

The computer program code used to perform the operations of the present disclosure may be written in one or more programming languages or a combination thereof. The programming languages include object-oriented programming languages such as Java, Smalltalk, C++, and also include conventional procedural programming languages such as "C" language or similar programming languages. The program code may be executed entirely on a user's computer, partly on the user's computer, executed as an independent software package, partly on the user's computer and partly executed on a remote computer, or entirely executed on the remote computer or server. In the case of a remote computer, the remote computer may be connected to the user's computer over any network including a local region network (LAN) or a wide region network (WAN), or may be connected to an external computer (for example, using an Internet service provider to connect over the Internet).

What is claimed is:

1. A method for recognizing a video action, comprising:
    acquiring a current video frame and at least one forward video frame;
    determining an action recognition result of the current video frame and an action recognition result of the at least one forward video frame, by inputting the current video frame and the at least one forward video frame into an action recognition model, wherein the action recognition model is trained using a convolutional neural network, and has a function of recognizing an action category and action positioning information in video frames, and the action recognition result comprises the action category and the action positioning information;

acquiring a target action category of the current video frame by correcting the action category of the current video frame based on an action category of the at least one forward video frame;

acquiring target action positioning information of the current video frame by correcting the action positioning information of the current video frame based on action positioning information of the at least one forward video frame;

determining action content of a video based on the target action category and the target action positioning information of the current video frame; and triggering special effects predefined at an action positioning point in combination with the action category upon acquisition of the action category and action positioning information of the current video frame;

wherein determining the action category of the current video frame comprises: acquiring a confidence of at least one defined action category by inputting the current video frame into the action recognition model; and selecting a defined action category with a highest confidence from the at least one defined action category as the action category of the current video frame;

wherein acquiring the target action category of the current video frame by correcting the action category of the current video frame based on the action category of the at least one forward video frame comprises:

summing confidences of each of the at least one defined action category in the at least one forward video frame and the current video frame;

acquiring a defined action category with a highest sum of the confidences;

determining a number of action categories being the same as the defined action category with the highest sum of the confidences among the action categories of the at least one forward video frame and the current video frame;

among the action categories of the at least one forward video frame and the current video frame, a determination that the number of action categories being the same as the defined action category with the highest sum of the confidences exceeds a defined number results in the defined action category with the highest sum of the confidences being determined as the target action category; and among the action categories of the at least one forward video frame and the current video frame, a determination that the number of action categories being the same as the defined action category with the highest sum of the confidences does not exceed the defined number results in the action category of the current video frame being determined as the target action category.

2. The method according to claim 1, wherein the action positioning information comprises a width of an action block, a height of the action block, and center coordinates of the action block.

3. The method according to claim 2, wherein acquiring the target action positioning information of the current video frame by correcting the action positioning information of the current video frame based on the action positioning information of the forward video frame of the current video frame comprises:

acquiring a gain factor for the width or the height of the action block; and calculating a width or a height of a target action block according to the following formula based on the gain factor:

$$x = x2 + k(x1 - x2);$$

where x represents the width or the height of the target action block, k represents the gain factor, x1 represents a width or a height of an action block of the current video frame, and x2 represents a width of an action block of the forward video frame or a height of an action block of the forward video frame;

acquiring a gain matrix for the center coordinates of the action block; and calculating center coordinates of the target action block according to the following formula based on the gain matrix:

$$Y = Y2 + K*(Y1 - H*Y2);$$

where Y represents the center coordinates of the target action block, Y2 represents center coordinates of the action block of the previous video frame, K represents the gain matrix, H represents a unitary matrix, and Y1 represents center coordinates of the action block of the current video frame.

4. The method according to claim 3, further comprising:
updating the positioning information of the target action block to the positioning information of the action block of the forward video frame based on a determination result that the absolute value of a difference between the positioning information of the target action block and the positioning information of the action block of the forward video frame is less than a predefined threshold.

5. The method according to claim 3, wherein the gain factor is calculated according to the following formula:

$$k = p\_/(p\_ + r);$$

where $p\_ = p + q$, p represents a posterior error, $p\_$ represents a prior error, q represents a process deviation, and r represents a measurement deviation; and the gain matrix is calculated according to the following formula:

$$K = P\_ * H^T * S^{-1};$$

where $P\_ = A * err * A^T + Q$, $S = H * P\_ * H^T + R$, A represents a motion matrix, Q represents a process variance matrix, R represents a measurement variance matrix, err is a center point error matrix, and H represents a unitary matrix.

6. The method according to claim 1, wherein acquiring the current video frame and determining the action recognition result of the current video frame comprise:

acquiring initial action positioning information of the current video frame by inputting the current video frame into a first action recognition sub-model based on a determination result that the current video frame is a predefined key frame, determining a first image region to be recognized of the current video frame based on the initial action positioning information, and acquiring the action recognition result of the current video frame by inputting the first image region to be recognized into a second action recognition sub-model, wherein the first action recognition sub-model and the second action recognition sub-model are trained using different convolutional neural networks; and determining a second image region to be recognized of the current video frame based on action block positioning information of the forward video frame based on a determination result that the current video frame is not a predefined key frame, and acquiring the action recognition result of the current video frame by inputting the second image region to be recognized into the second action recognition sub-model.

7. The method according to claim 1, wherein the video action is a user's gesture, the action category is an aspect of a gesture, and the action positioning information is a movement trajectory of the gesture.

8. The method of claim 3, further comprising:
updating the width of the target action block to the width of the action block of the forward video frame based on a determination result that an absolute value of a difference between the width of the target action block and the width of the action block of the forward video frame is less than a first predefined threshold;
updating the height of the target action block to the height of the action block of the forward video frame based on a determination result that an absolute value of a difference between the height of the target action block and the height of the action block of the forward video frame is less than a second predefined threshold; and/or
updating an abscissa of the center coordinates of the target action block to an abscissa of the center coordinates of the action block of the previous video frame based on a determination result that an absolute value of the difference between the abscissa of the center coordinates of the target action block and the abscissa of the center coordinates of the action block of the previous video frame is less than a third predefined threshold, and updating an ordinate of the center coordinates of the target action block to an ordinate of the center coordinates of the action block of the previous video frame based on a determination result that an absolute value of a difference between the ordinate of the center coordinates of the target action block and the ordinate of the center coordinates of the action block of the previous video frame is less than a fourth predefined threshold.

9. The method according to claim 6, wherein the predefined key frame is a frame spaced apart by a defined number of video frames.

10. The method according to claim 6, wherein the first image region to be recognized is acquired in respond to expanding a defined region or defined pixel points based on a region encircled by an initial action block upon acquisition of the initial positioning information.

11. The method according to claim 6, wherein the second image region to be recognized is acquired by expanding a defined region or defined pixel points based on a region encircled by the action block of the forward video frame.

12. The method according to claim 1, wherein the video is a live video or an on-demand video.

13. A computer device, comprising a memory, a processor, and a computer program stored on the memory and running on the processor, wherein the processor, when running the computer program, is caused to perform a method of:
acquiring a current video frame and at least one forward video frame;
determining an action recognition result of the current video frame and an action recognition result of the at least one forward video frame, by inputting the current video frame and the at least one forward video frame into an action recognition model, wherein the action recognition model is trained using a convolutional neural network, and has a function of recognizing an action category and action positioning information in video frames, and the action recognition result comprises the action category and the action positioning information;
acquiring a target action category of the current video frame by correcting the action category of the current video frame based on an action category of the at least one forward video frame;
acquiring target action positioning information of the current video frame by correcting the action positioning information of the current video frame based on action positioning information of the at least one forward video frame;
determining action content of a video based on the target action category and the target action positioning information of the current video frame; and
triggering special effects predefined at an action positioning point in combination with the action category upon acquisition of the action category and action positioning information of the current video frame;
wherein determining the action category of the current video frame comprises:
acquiring a confidence of at least one defined action category by inputting the current video frame into the action recognition model; and
selecting a defined action category with a highest confidence from the at least one defined action category as the action category of the current video frame;
wherein acquiring the target action category of the current video frame by correcting the action category of the current video frame based on the action category of the at least one forward video frame comprises:
summing confidences of each of the at least one defined action category in the at least one forward video frame and the current video frame;
acquiring a defined action category with a highest sum of the confidences;
among the action categories of the at least one forward video frame and the current video frame, in response to a number of action categories being the same as the defined action category with the highest sum of the confidences exceeds a defined number, determining the defined action category with the highest sum of the confidences as the target action category; and
among the action categories of the at least one forward video frame and the current video frame, in response to the number of action categories being the same as the defined action category with the highest sum of the confidences does not exceed the defined number, determining the action category of the current video frame as the target action category.

14. A non-transitory computer-readable storage medium storing a computer program therein, wherein the computer program, when run by a processor of a computer device, causes the computer device to perform the method as defined in claim 1.

15. A method for recognizing a video action, comprising:
acquiring a current video frame and at least one forward video frame;
determining an action recognition result of the current video frame and an action recognition result of the at least one forward video frame, by simultaneously inputting the current video frame and the at least one forward video frame into an action recognition model, wherein the action recognition model is trained using a convolutional neural network, and has a function of recognizing an action category and action positioning information in video frames, and the action recognition result comprises the action category and the action positioning information;

acquiring a target action category of the current video frame by analyzing the current video frame and the at least one forward video frame;

acquiring target action positioning information of the current video frame by analyzing the current video frame and the at least one forward video frame of the current video frame; and determining action content of a video based on the target action category and the target action positioning information of the current video frame; and wherein determining the action category of the current video frame comprises: acquiring a confidence of at least one defined action category by inputting the current video frame into the action recognition model; and selecting a defined action category with a highest confidence from the at least one defined action category as the action category of the current video frame;

wherein acquiring the target action category of the current video frame by analyzing the action category of the current video frame based on the action category of the at least one forward video frame comprises:

summing confidences of each of the at least one defined action category in the at least one forward video frame and the current video frame;

acquiring a defined action category with a highest sum of the confidences;

determining a number of action categories being the same as the defined action category with the highest sum of the confidences among the action categories of the at least one forward video frame and the current video frame;

among the action categories of the at least one forward video frame and the current video frame, a determination that the number of action categories being the same as the defined action category with the highest sum of the confidences exceeds a defined number results in the defined action category with the highest sum of the confidences being determined as the target action category; and among the action categories of the at least one forward video frame and the current video frame, a determination that the number of action categories being the same as the defined action category with the highest sum of the confidences does not exceed the defined number results in the action category of the current video frame being determined as the target action category.

16. The method according to claim 15, further comprising:

triggering special effects predefined at an action positioning point in combination with the action category upon acquisition of the action category and action positioning information of the current video frame.

* * * * *